United States Patent

Ogawa et al.

[11] 4,185,893
[45] Jan. 29, 1980

[54] ZOOM LENSES

[75] Inventors: Ryota Ogawa; Sadao Okudaira, both of Saitama; Takayuki Itoh, Tokyo; Satoru Tachihara, Saitama, all of Japan

[73] Assignee: Asahi Kogaku Kogyo Kabushiki Kaisha, Tokyo, Japan

[21] Appl. No.: 913,274

[22] Filed: Jun. 7, 1978

[30] Foreign Application Priority Data

Jun. 10, 1977 [JP] Japan .................. 52-68698

[51] Int. Cl.² .......................... G02B 15/14
[52] U.S. Cl. .................. 350/184
[58] Field of Search .......... 350/184, 186, 176, 177

[56] References Cited

U.S. PATENT DOCUMENTS 4,074,931  2/1978  Okudaira .................. 350/184

FOREIGN PATENT DOCUMENTS

2601499  7/1976  Fed. Rep. of Germany .......... 350/184

Primary Examiner—Paul A. Sacher
Attorney, Agent, or Firm—Sughrue, Rothwell, Mion, Zinn and Macpeak

[57] ABSTRACT

Compact, high performance low zoom ratio variable viewing angle lens systems are provided by constructing the lens systems of two lens groups separated by a variable aerial space and limiting the dimensions of the lens systems by various mathematical conditions.

5 Claims, 15 Drawing Figures

ZOOM LENSES

BACKGROUND OF THE INVENTION

The present invention relates to a still camera wherein a trimming effect or a view angle widening effect, otherwise known as a zoom effect, can be achieved. The trimming effect is considered to be an important photographic technique for determining the appropriate framing by take parts of a picture away. Generally, the trimming is accomplished at the stage of developing by a third party or experts. Therefore, general photographers must be satisfied with this and it is sometimes difficult to make good use of the photographer's intention. Also, it is difficult to direct the developer to the picture framing and, accordingly, most photographed films are printed as they are originally framed in photographing. Further, in trimming after photographing, the picture quality must be reduced due to wasting a part of the original photographed film.

The above defect is often remarkable in cameras having a single or stationary focus. For this reason, if a zoom lens is used, it is possible to trim the picture and overcome the above defect to some extent. However, this also leads to a disadvantage that the size of the lens system is liable to be large in comparison with a single or fixed focus lens system. A view angle widening effect, which is opposite to the trimming effect, is also useful in photographic framing.

SUMMARY OF THE INVENTION

In view of the above matters, the present invention provides a low zoom ratio variable viewing angle lens system having a trimming effect and viewing angle widening effect at the photographing stage and at the same time exhibiting high performance and compactness even in comparison to a fixed viewing angle lens system in the same class. More specifically, the invention provides zoom lens system having viewing angle ranges of about 70° to 80°, about 60° to 65° substantially same as a standard lens system. Of course, those zoom lens systems are provided with a trimming effect and a viewing angle widening effect.

The zoom lens systems each include a front lens group having a negative focal length and a final positive lens convex to the object, a rear lens group having a positive focal length and a variable aerial space therebetween for adjustment of the viewing angle. The minimum overall focal length as well as the focal lengths of the front and rear lens groups are subjected to various mathematical conditions which provide the optimum balance between miniaturization and performance.

DETAILED DESCRIPTION OF THE INVENTION

The present invention will be hereinafter described in detail.

In a lens system according to the present invention, the lens system can be divided into two groups by a position in which the light beam is remarkably divergent. That is, the lens system can be divided into a front lens group having a negative focal length $f_1$ and a rear lens group having a positive focal length $f_2$. The final lens in the front lens group is a convex lens. A space l to the image side of the above mentioned convex lens, that is, a space l between the front and rear lens groups, can be shortened so that the covering angle of the refractive light side is decreased. The maximum value of the length l is $l_{max}$. The overall focal length of the system is $f_{min}$ when the length l is maximum.

The lens system according to the present invention satisfies the following equation:

$$0.7 \leq \frac{f_2}{f_{min}} \leq 1.3 \quad \text{Ia} \tag{I}$$

$$0.1 \leq \frac{l_{max}}{f_{min}} \leq 0.7 \quad \text{Ib}$$

Dividing a lens system so as to satisfy the above equation will result in providing a compact lens system having high performance. Especially, the positioning of the final convex lens in the first or front lens group means preventing various aberrations together with preventing the relative movement between front and rear lens groups from varying and increasing. Above the upper limit of the condition Ia, the lens power of the rear lens group is weakened. Accordingly, exceeding the upper limit is useful for aberration compensation and the region exceeding the upper limit is often utilized for a two lens group type wide zoom lens. However, this also requires widening the length l between the front and rear lens groups and leads to the disadvantage that the overall length of the lens system is elongated and the diameter of the first lens is increased. Thus, the object of the invention will not be achieved if the upper limit is exceeded. The lower limit defines the lens performance. Below the lower limit, the lens power of each lens surface is too strong. This is unsuitable for a lens system having a relative movement portion, that is, a zoom lens, to compensate for the aberrations. In other words, below the lower limit, it is possible for a fixed viewing angle lens system to compensate for the aberrations, but reduction below the lower limit value is not acceptable for the lens system of the present invention.

Condition Ib defines the compactness of the zoom lens together with condition Ia. In condition Ib, above the upper limit, the overall length of the lens system is unduly elongated because it is necessary to weaken the lens power of the rear lens group. The lower limit is required to maintain a suitable amount of trimming. Below the lower limit, sufficient trimming effect cannot be obtained. In this range, in order to maintain a suitable amount of trimming a lens power of each lens surface is too strong and good aberration compensation cannot be achieved.

When these two conditions are maintained, a variable viewing angle lens exhibiting fine performance can be achieved and a high degree of miniaturization can also be achieved. In relation to the particular camera size used, the back focal length of the lens system can be maintained at least 0.8 L$\phi$ while the minimum value of the overall length of the system, including the back focal length, is no more than 2.3 L$\phi$, where L$\phi$ is the diagonal of the image frame. For a 35 mm camera, for instance, the image frame of the film is 36×24 mm, resulting in a diagonal of approximately 43.26 mm, a back focal length of at least 34.61 mm and a minimum overall length of no more than 99.51 mm.

The first example of the invention satisfying Eq. (I) relates to a lens system in a so-called wide angle lens wherein the angle of view is about 70° to 80° and the trimming effect and the viewing angle widening effect can be attained. The focal length of a modern 35 mm camera is about 28 mm. A stress or accent tends to be reduced in a picture taken by such a camera. For good photographing, a relatively high photographic technique is required. The invention provides a lens system which is easy to use in such a wide receiving angle.

The front lens group is composed in combination of at least two positive lenses and two negative lenses and has a negative focal length $f_1$ ($f_1 < 0$). The specific construction of the front lens group comprises, in order from the object side, the first positive meniscus lens a convex surface of which faces the object, negative lens units and a final positive meniscus lens a convex surface of which faces the object. The rear lens group comprises positive, negative and positive lens units in order from the object side and has a positive focal length $f_2$ ($f_2 > 0$). The positive lens units positioned to the object side and the image side are composed of at least two positive lenses, respectively.

The lens system should satisfy the following conditions.

$$0.7 \leq \frac{|f_1|}{f_{min}} \leq 1.4 \quad (1a)$$

$$0.1 \leq \frac{d_I}{f_{min}} \leq 0.35 \quad (2a)$$

$$0.6 \leq \frac{r_I}{f_{min}} \leq 1.4 \quad (3a)$$

$$0.02 \leq \frac{d_{II}}{f_{min}} \leq 0.12 \quad (4a)$$

where:

$d_I$ is the aerial space to the object side of the final positive meniscus lens in the front lens group, $r_I$ is the radius of curvature of the object side of the same positive meniscus lens, $d_{II}$ is the aerial space between the negative lens unit and the positive lens unit following the negative lens unit in the rear lens group, and $f_{min}$ is the focal length of the overall lens system at the wide angle end.

The conditions will be illustrated in detail.

In the front lens group, the first positive lens a convex surface of which faces the object is so positioned that the diameters of the following lenses can be descreased and that, when the lens power of each lens is designed to be strong, various aberrations can be maintained within a narrow range. As a result, this arrangement serves to provide a small lens system. Also, in the front lens group, the final positive meniscus lens a convex surface of which faces the object is so positioned that the total amount of the various aberrations generated therein can be maintained within a narrow range, the variation of the various aberrations together with the relative movement of the front and rear lens group can be reduced and, further, the spherical aberration, the chromatic aberration and the astigmatism generated therein can be effectively compensated for.

In the rear lens group, the positive lens unit facing the object which is composed of two positive lenses is required to reduce the diameter of the overall rear lens group, to reduce the generation and the variation of the spherical lens and to limit the astigmatism which tends to be generated in the positive lens unit to a small amount. In the rear lens group, the final positive lens unit which is composed of two positive lenses is required to relatively shorten the focal length of the rear lens group. As a result, in principle, the lens system can be miniaturized. The negative lenses positioned before the positive lens unit can be shifted toward the object. That is, if the positive lens unit is shifted to the object, the position of entrance pupil also nears to the object, to thereby reduce the diameter of the first lens, obtaining a sufficient back focal length.

Condition (1a) defines the lens system which the invention relates to, together with the aforementioned equation (I), to a compact and high performance lens system. Above the upper limit of condition (1a), the length of the overall lens system in the wide angle position becomes unduly long and the diameter of the first lens increases. Below the lower limit of condition (1a), power of each lens in the front lens group is increased so that the aberration compensations are not effectively achieved.

Condition (2a) defines the sufficient back focal length. Also, condition (2a) limits the variation of the aberrations generated in the front lens group to a good value together with condition (3a). Above the upper limit of condition (2a), it is possible to maintain a long back focal length but the position of the marginal light beam in the positive lenses in the front lens group is very far from the optical axis. As a result, various aberrations such as a spherical aberration are abruptly generated and the overall length of the lens system is increased. Under the lower limit of condition (2a), the back focal length is shortened. In order to prevent the back focal length from being shortened, spaces between the adjacent negative lens units in the front lens group or the space between the front and rear lens groups must be widened. As a result, the diameter of the first lens and the overall length of the lens system are increased.

Condition (3a) is required to maintain a good aberration balance together with condition (2a). Above the upper limit of condition (3a), it is difficult to compensate for the rather large amount of spherical aberration and chromatic aberration generated in the negative lens units in the front lens group. In order to avoid this difficulty, it is necessary to exceed the upper limit of condition (1a) or to weaken the power of each lens so that the size of the lens system tends to be enlarged. Below the lower limit of condition (3a), miniaturizing of the lens system is easy but when the condition (1a) is satisfied the various aberrations are excessive because the back focal length becomes too long.

Condition (4a) is required in order to control astigmatism and distortion. $d_{II}$ must satisfy condition (4a) in order to compensate for, or balance on the reversal direction, the image distortion generated in the positive lens unit nearest to the object in the rear lens group.

Above the upper limit, the amount of compensation for this aberration is excessive and, further, a barrel shaped distortion aberration is disadvantageously generated. In addition, the overall length of the lens system becomes too long. Below the limit, the opposite disadvantages are encountered, that is, the astigmatism is under-compensated so that the balance of the aberrations is undesirable.

A second embodiment of a lens system which satisfies the above mentioned equation (I) relates to the lens system having a view angle of about 60° to 65° with trimming effect which satisfies the above mentioned equation (I). A 24×36 mm film frame camera in the above class has a focal distance of about 35 mm. In framing of the picture, it is difficult to determine the distance between the camera and the object. In scenery photography where the object is very far from the operator, the framing variation together with the movement of the camera position is very small and difficult to accomplish. In view of the above, the present invention provides a photographic lens system which is easy to use.

The front lens group is composed, in combination, of two negative lenses and single positive lens and has a negative focal length of $f_1$ ($f_i<0$). The rearmost lens of an extreme convex surface of which faces the object is a final positive lens. The rear lens group composed of positive, negative and positive lens units in order from the object side and has a positive resultant focal length $f_2$ ($f_2>0$). The positive lens units in the rear lens group are both composed of at least two positive lenses. In the above front lens group, $d_I$ is the aerial space to the object side of the final positive lens. $r_I$ is the radius of curvature of the surface facing the object of the final positive lens of the front lens group and $d_{II}$ is the aerial space toward the object side of the positive lens unit nearest the image side in the rear lens group. The lens system, in addition to satisfying equation (I), satisfies the following conditions:

$$1.2 \leq \frac{|f_1|}{f_{min}} \leq 2.4 \quad (1b)$$

$$0.02 \leq \frac{d_I}{f_{min}} \leq 0.20 \quad (2b)$$

$$0.6 \leq \frac{r_I}{f_{min}} \leq 1.4 \quad (3b)$$

$$0.05 \leq \frac{d_{II}}{f_{min}} \leq 0.25 \quad (4b)$$

where $f_{min}$ is the overall focal length in the wide angle position. The conditions will be hereinafter illustrated in detail.

In the first embodiment it is apparent that an advantageous feature of the present invention is that the positive lens facing the object in the front lens is not required. The positive lens functions to miniaturize the following lens diameters and limits the various aberrations to a small value while enhancing the overall lens power of the front lens group. However, because the power of the front lens group of the present invention is relatively weak as defined in condition (1b), the necessity of the above positive lens is diminished. The arrangement of the rear lens group is the same as defined in the above item first embodiment and functions approximately the same.

Condition (1b) is required to define the lens system of the invention having a good performance and a small size together with equation (Ia). In comparison with condition (1a), the numeral range is shifted to a greater range so that the back focal length may not be elongated unnecessarily and the total amount of the various aberrations may be limited to a small value. In the lens system according to the invention, the front lens power can be suitably determined.

Condition (2b) is required to retain the overall various aberrations of the front lens group to a small value together with condition (3b). In comparison with condition (2a), the range of condition (2b) is shifted to a smaller range. Near the upper limit, a long back focal length can be provided; however, in the lens system according to the present invention it is desirable to stay below the upper limit in order to enhance the lens miniaturization. Below the lower limit, there exist residual amounts of the various aberrations, especially the spherical aberration and the chromatic aberration.

Condition (3b) is the same as condition (3a). Condition (4b) is required to compensate for the astigmatism and the distortion. The numeral range of condition (4b) must be shifted to a greater range than that of condition (4a) because, since the view angle of the invention is narrower than that of the first embodiment, the dispersion characteristic of the second embodiment is low in the front lens group. Owing to this tendency, the refractive light beam to the positive lens facing the image in the rear lens group becomes less dispersion characteristic and the astigmatism formed by the incidental light beam is undercompensated in comparison with that of the first embodiment. For this reason, it is possible to maintain the position of the positive lens in the range of condition (4b) with good aberration balance.

The third embodiment of the invention which satisfies equation (I) relates to a lens system having a view angle as in a so-called standard lens in addition to the trimming effect to widen the application field of such lens system. The focal length of a 24×36 mm film frame camera is about 50 mm. In such a camera, an optical system in which the symmetrical characteristics are remarkable, such as a Gaussian type optical system, is generally used. In order to obtain the trimming effect, that is, so satisfy equation (I), the basic lens construction is of a retrofocus type. Accordingly, the back focal length tends to become long. To miniaturize the lens system, the back focal length should be shortened as in the first two embodiments.

For this reason, the basic lens system is composed as follows.

The front lens group is composed, in combination, of two negative lenses and a single positive lens and has a negative focal length $f_1$ ($f_1<0$). In the front lens group, the lens nearest to the image, an extreme convex surface of which faces the object, is a final positive lens. The rear lens group is composed of positive, negative and positive lens units and has a positive focal length $f_2$ ($f_2>0$). The positive lens unit near the object is composed of at least two positive lenses and the positive lens unit near the image is composed of at least one positive lens.

In the front lens group, $d_I$ is the aerial space to the object side from the final positive lens to the adjacent lens, $r_I$ is the radius of curvature of the surface facing the object of the final positive lens of the front lens group. In the rear lens group, $d_{II}$ is the aerial space toward the object side of the positive lens unit near to the image side.

The third embodiment satisfies the following conditions:

$$1.5 \leq \frac{|f_1|}{f_{min}} \leq 4.0 \tag{1c}$$

$$0 \leq \frac{d_I}{f_{min}} \leq 0.10 \tag{2c}$$

$$0.6 \leq \frac{r_I}{f_{min}} \leq 1.4 \tag{3c}$$

$$0.1 \leq \frac{d_{II}}{f_{min}} \leq 0.4 \tag{4c}$$

where $f_{min}$ is the overall focal length in the wide angle position. The conditions will be hereinafter illustrated in detail.

The front lens group is arranged essentially the same as the second embodiment. In the rear lens group, one of the necessary positive lenses can be eliminated. The lens system is different from the first two embodiments for this reason. The range of condition (1c) differs from those of (1a) and (1b) to a great extent. Below the lower limit, the retrofocus feature type will be enhanced. This is unsuitable in view of the basic construction of the standard lens. Especially, the back focal length becomes unnecessarily long.

In contrast, the greater the limiting numerals of condition (1c), the better the aberration compensation. Especially, the overall lens length including the back focal length is effectively shortened. However, the overall length at the wide angle position is unduly elongated and the diameter of the frontmost lens is increased and, therefore, it is desirable to keep within the upper limit of condition (1c).

Condition (2c) is required to reduce the residual aberrations in the front lens group together with condition (3c), though the limiting range is relatively small in comparison with those of the first two embodiments. The reason is that the aberration generated in the negative lens is relatively low.

Condition (4c) is required to over-compensate for the astigmatism by separating the positive lens unit near to the image from the preceding lens unit in the rear lens group. This means that the positive lens unit functions oppositely to the function of the typical retrofocus-type disclosed in the first embodiment.

Therefore, the lower limit is required to achieve the astigmatism over-compensation. While the upper limit is required to prevent the barrel-shaped distortion from being generated and the spherical aberration from being excessively over-compensated for.

In the fourth embodiment, the power arrangement of the front lens group and the rear lens group is determined at a value in a specific range, and the variation amount of the overall lens length during the whole variable viewing angle is determined at an extremely small value which is smaller than that of the depth of focus. Therefore, an object of this embodiment is to provide an extremely small variable viewing angle lens system wherein the rear lens group is fixed and the front lens group is relatively movable with respect to the image surface. This variable view angle lens system is very small.

Before a detailed explanation of each lens system condition, the movement characteristic of two lens group-type lens system should be described.

$f_1$ is the focal length of the front lens group ($f_1 < 0$).
$f_2$ is the focal length of the rear lens group ($f_2 > 0$).
$l$ is the space between the first and second lens groups.

The overall focal length satisfies the following equation.

$$\frac{1}{f} = \frac{1}{f_1} + \frac{1}{f_2} - \frac{l}{f_1 f_2} \tag{5}$$

The back focal length $f_B$ is as follows:

$$f_B = f_2 - \frac{f_2}{f_1} f \tag{6}$$

The overall length is:

$$L = l + f_B = f_1 + 2f_2 - \frac{f_2}{f_1} f - \frac{f_1 f_2}{f} \tag{7}$$

The first differential is:

$$\frac{dL}{df} = -f_2 \left( \frac{1}{f_1} - \frac{f_1}{f^2} \right) \tag{8}$$

The second differential is:

$$\frac{d^2 L}{df^2} = -2 f_1 f_2 \frac{1}{f^3} \tag{9}$$

In equation (8), if $dL/df = 0$;

$$f = |f_1| = -f_1 \tag{10}$$

In equation (9), when $f > 0$;

$$d^2 L / df^2 > 0 \tag{11}$$

Therefore, when $f = -f_1$, the overall length is minimum. In this case, if the overall length is represented by $L_{min}$;

$$L_{min} = f_1 + 4 f_2 \tag{12}$$

From equation (11), if $f > 0$, a plot of the relation between L and f is downwardly convex. Therefore, if a range of $f_{min}$ to $f_{max}$ is given, the variation amount of the overall length has a minimum value when the overall length $Lf_{min}$ at the wide angle is equal to the overall length $Lf_{max}$ at the narrow angle.

$$\left. \begin{array}{l} Lf_{min} = f_1 + 2f_2 - \dfrac{f_2}{f_1} f_{min} - \dfrac{f_1 f_2}{f_{min}} \\[2mm] Lf_{max} = f_1 + 2f_2 - \dfrac{f_2}{f_1} f_{max} - \dfrac{f_1 f_2}{f_{max}} \end{array} \right\} \tag{13}$$

If $Lf_{min} = Lf_{max}$;

$$f_1 = -\sqrt{f_{min} f_{max}} \tag{14}$$

In this case, the variation amount e of the overall length is;

$$\epsilon = L f_{min} - L_{min} = f_2(\sqrt{\frac{f_{max}}{f_{min}}} + \sqrt{\frac{f_{min}}{f_{max}}} - 2) \quad (14)$$

Therefore, if the focal length $f_1$ of the front lens group is about $-\sqrt{f_{min}f_{max}}$, the shorter the focal length of $f_2$, the smaller the variation amount of the overall length.

The lens arrangement of the fourth embodiment will now be described in detail.

The front lens group is composed, in combination, of two negative lenses and two positive lenses and has a negative focal length $f_1 (f_1 < 0)$.

The first lens of the front lens group is a positive lens a convex surface of which is directed to the object. The negative lens units follow the first positive lens. The final lens of the front group is a positive meniscus lens a convex surface of which is directed to the object. The rear lens group is composed of positive, negative and positive lens units in order from the object side and has a positive focal length $f_2 (f_2 > 0)$. The positive lens units to the object and image sides are composed of at least two positive lenses, respectively. The front and rear lens groups are arranged so as to have a specific lens power distribution.

$$0.90 \leq \frac{|f_1|}{\sqrt{f_{min}f_{max}}} \leq 1.10 \quad (15)$$

$$0.80 \leq \frac{f_2}{|f_1|} \leq 0.95 \quad (16)$$

where;

$f_{min}$ is the overall focal length at the wide angle,
$f_{max}$ is the overall focal length at the narrow angle.

The above conditions are satisfied with the lens system wherein the variation amount of the view angle is limited to an extremely small value and a sufficient back focal length is obtained. The first positive lens, a convex surface of which is directed to the object, in the front lens group is so arranged that when the front lens group is miniaturized, the increase of the diameter of the first lens may be prevented and the increase of the barrel shaped distortion may be prevented.

The positive meniscus lens a convex surface of which is directed to the object in the first lens group is so arranged that the variation and the increase of the various aberrations which are generated together with the focussing and the view angle variation of the definitive object may be prevented. In the rear lens group, the two positive lenses to the object side are arranged in order to prevent the variation and the increase of the spherical aberration which is generated together with the view angle variation, and the two positive lenses to the image side are arranged in order to prevent the variation and the increase of the astigmation and the distortion which are generated together with the view angle variation.

Conditions (15) and (16) relate to the lens power arrangement. As mentioned above, in condition (15), when $|f_1|/\sqrt{f_{min}f_{max}} = 1.0$, the overall length at the wide angle is equal to the overall length at the narrow angle. If the value is smaller than the lower limit, the overall length at the narrow angle is elongated to thereby increase the variation amount of the overall length. If the value is greater than the upper limit, the overall length at the wide angle is elongated to have the same effect. With respect to condition (16), the shorter the focal length of the rear lens group, the smaller the variation amount of the overall length, as mentioned above. However, because the overall focal length is determined by condition (15), if the value is smaller than the lower limit, it is possible to limit the variation amount of the overall length but the back focal length must be shortened or the range of the variable view angle must be limited to a small value. In order to correct this, the compensation for the various aberrations is difficult. Above the upper limit, the variation amount of the overall length becomes unduly long.

The following are detailed parameters of various lenses illustrative of the above-described embodiments. In each of the examples:

f: residual focal length of entire system
$f_1$: focal length of the front lens group
$f_2$: focal length of the rear lens group
$n_i$: the refractive index in a d-line of the ith lens from the object side of the system
$\nu_i$: Abbe's number of the ith lens from the object side of the system
$r_j$: radius of curvature of each lens surface in order from the object side of the system
$d_k$: the distance along the optical axis between the kth surface and (k+1)th surface starting from the object side of the system
$d_I$: the space to the object side of the final positive lens in the front lens group
$d_{II}$: the space to the object side of the final positive lens unit in the rear lens group
$r_f$: the radius of curvature of the object surface of the final positive lens in the front lens group All dimensions given are in millimeters.

EXAMPLE I

Figure 1:
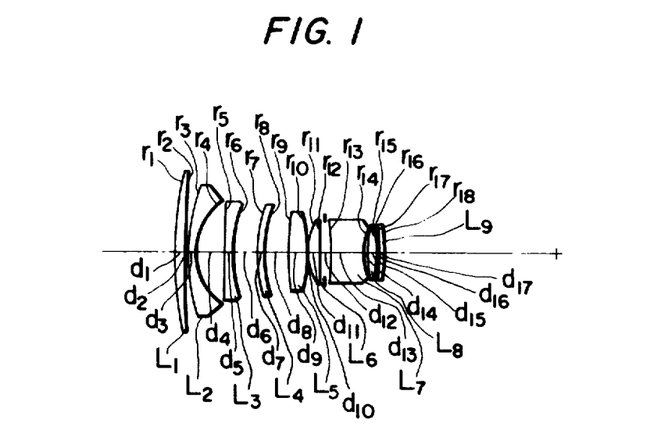
FIGS. 1, 3, 5, 7 and 9 illusrate examples of various embodiments of lens systems according to the present invention.
Figure 2A:
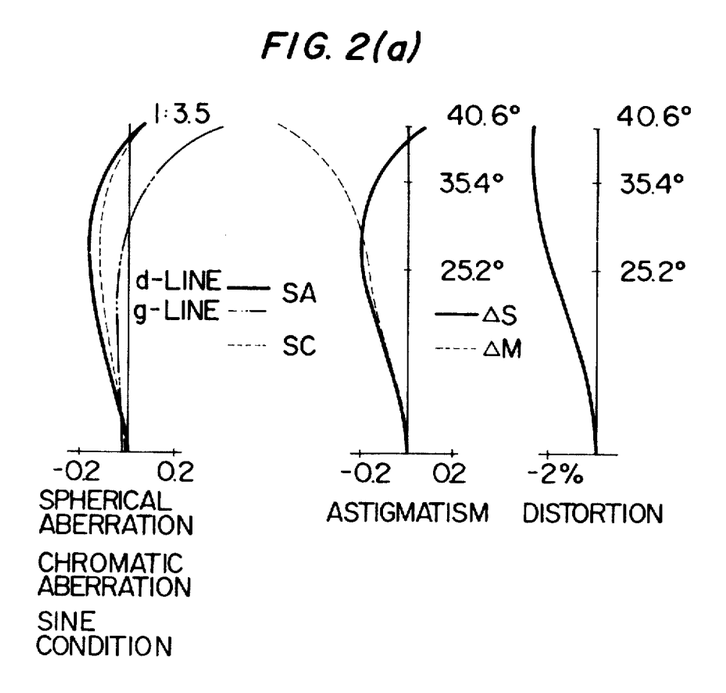
FIGS. 2(a), 4(a), 6(a), 8(a) and 10(a) are diagrams showing aberration curves for the lens systems of FIGS. 1, 3, 5, 7 and 9, respectively, at their wide angle positions.
Figure 2B:
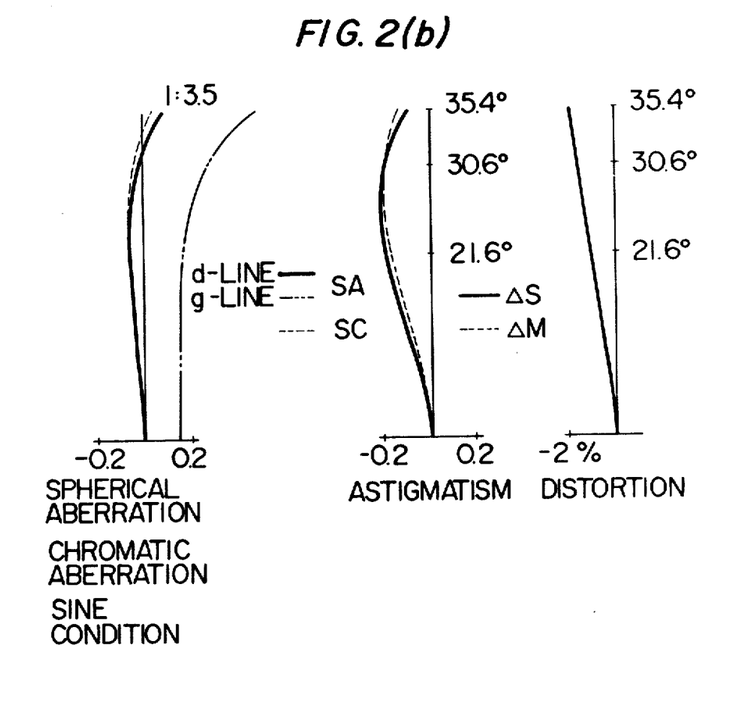
FIGS. 2(b), 4(b), 6(b), 8(b) and 10(b) are diagrams showing aberration curves for the lens systems of FIGS. 1, 3, 5, 7 and 9, respectively, at their narrow angle positions.

Example I, shown in FIG. 1, is illustrative of the first embodiment of the present invention. Lenses $L_1-L_4$ make up the front lens group and lenses $L_5-L_9$ from the rear lens group. The lens system parameters are as follows:

| Lens $L_i$ | j, k | r | d | n | $\nu$ |
|---|---|---|---|---|---|
| | | f = 26.0–31.0 | | view angle 2ω = 81.2°–70.8° | |
| $L_1$ | 1 | 91.9 | 2.54 | 1.51823 | 59.0 |
| | 2 | 1069.190 | | | |
| | | | 0.10 | | |
| $L_2$ | 3 | 42.130 | 1.37 | 1.80400 | 46.6 |
| | 4 | 13.703 | | | |
| | | | 6.45 | | |
| $L_3$ | 5 | 465.000 | 1.49 | 1.67790 | 50.7 |
| | 6 | 28.750 | | | |
| | | | 5.19 | | |
| $L_4$ | 7 | 23.270 | 1.82 | 1.78470 | 26.2 |
| | 8 | 34.700 | | | |
| | | | 5.02 – 1.669 | | |
| $L_5$ | 9 | 56.700 | 4.19 | 1.80610 | 40.9 |
| | 10 | −59.400 | | | |
| | | | 0.10 | | |
| $L_6$ | 11 | 18.093 | 2.31 | 1.80610 | 40.9 |
| | 12 | 56.517 | | | |
| | | | 2.37 | | |
| $L_7$ | 13 | −64.907 | 7.24 | 1.84666 | 23.9 |
| | 14 | 16.331 | | | |
| | | | 1.12 | | |
| | 15 | 43.469 | | | |

-continued

| $L_i$ | j, k | r | d | n | ν |
|---|---|---|---|---|---|
| $L_8$ | 16 | −23.588 | 2.25 | 1.51823 | 59.0 |
|  |  |  | 0.10 |  |  |
| $L_9$ | 17 | −89.373 | 1.47 | 1.51633 | 64.1 |
|  | 18 | −26.047 |  |  |  |

$f_1 = -23.201$
$f_2 = 23.303$
$l_{max} = 5.02$
$d_I = d_6 = 5.19$
$d_{II} = d_{14} = 1.12$
$r_I = r_7 = 23.270$

| focal length | f number | back focal length |
|---|---|---|
| 26.0 | 1:3.5 | 36.573 |
| 31.0 | 1:3.5 | 41.692 |

EXAMPLE II

Figure 3:
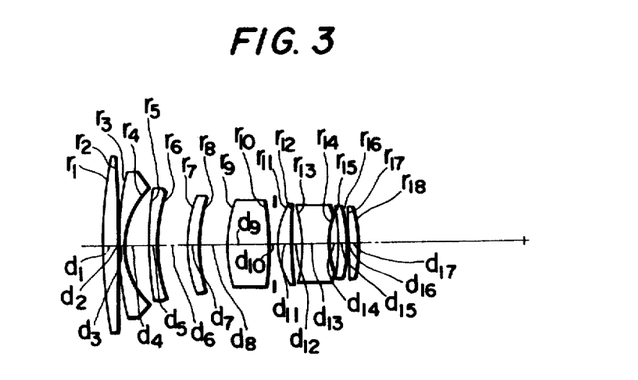
Figure 4A:
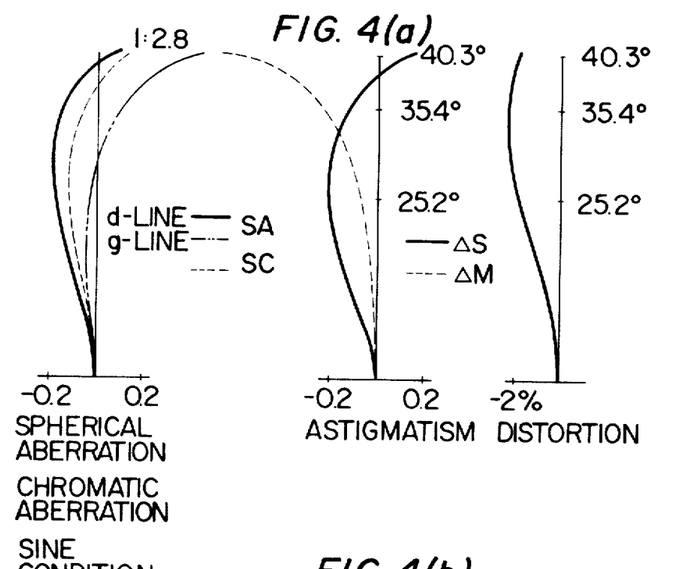
Figure 4B:
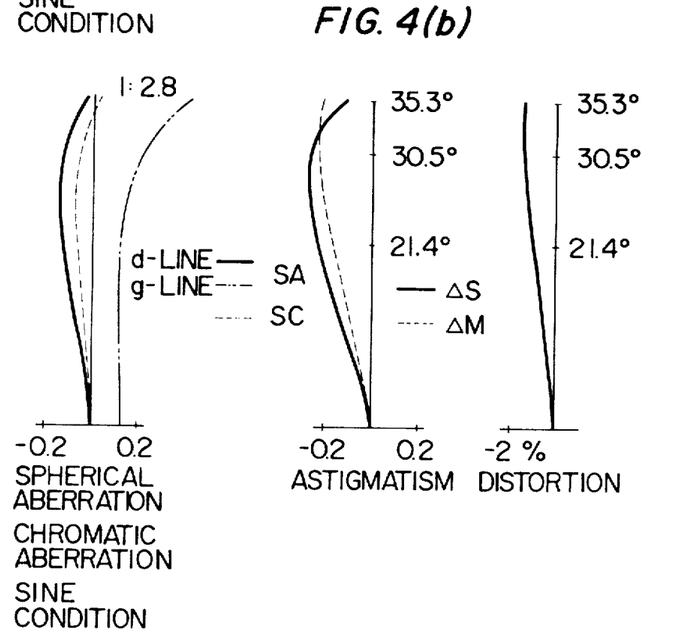

The second example is also illustrative of the first embodiment and is illustrated in FIG. 3. Lenses $L_1$-$L_4$ form the front lens group and lenses $L_5$-$L_9$ form the rear lens group. The system parameters are as follows:

| $f = 26.0-31.0$ | | | view angle $2\omega = 80.6°-70.6°$ | | |
|---|---|---|---|---|---|
| $L_i$ | j, k | r | d | n | ν |
| $L_1$ | 1 | 90.728 | 3.40 | 1.56873 | 63.1 |
|  | 2 | −2811.257 |  |  |  |
|  |  |  | 0.10 |  |  |
| $L_2$ | 3 | 65.898 | 1.50 | 1.80400 | 46.6 |
|  | 4 | 15.890 |  |  |  |
|  |  |  | 5.18 |  |  |
| $L_3$ | 5 | 73.486 | 1.40 | 1.80400 | 46.6 |
|  | 6 | 27.490 |  |  |  |
|  |  |  | 6.84 |  |  |
| $L_4$ | 7 | 25.726 | 2.40 | 1.80518 | 25.4 |
|  | 8 | 40.610 |  |  |  |
|  |  |  | 6.40 − 1.5341 |  |  |
| $L_5$ | 9 | 38.361 | 8.55 | 1.72342 | 38.0 |
|  | 10 | −77.574 |  |  |  |
|  |  |  | 2.00 |  |  |
| $L_6$ | 11 | 22.047 | 2.86 | 1.80400 | 46.6 |
|  | 12 | 109.428 |  |  |  |
|  |  |  | 1.53 |  |  |
| $L_7$ | 13 | −48.177 | 5.53 | 1.84666 | 23.9 |
|  | 14 | 20.603 |  |  |  |
|  |  |  | 1.94 |  |  |
| $L_8$ | 15 | −193.273 | 2.41 | 1.64000 | 60.1 |
|  | 16 | −23.453 |  |  |  |
|  |  |  | 0.10 |  |  |
| $L_9$ | 17 | −5771.737 | 2.10 | 1.51821 | 65.0 |
|  | 18 | −33.615 |  |  |  |

$f_1 = -28.866$
$f_2 = 27.173$
$l_{max} = 6.40$
$d_I = d_6 = 6.84$
$d_{II} = d_{14} = 1.94$
$r_I = r_7 = 25.726$

| focal length | f number | back focal length |
|---|---|---|
| 26.0 | 1:2.8 | 36.784 |
| 31.0 | 1:2.8 | 41.491 |

EXAMPLE III

Figure 5:
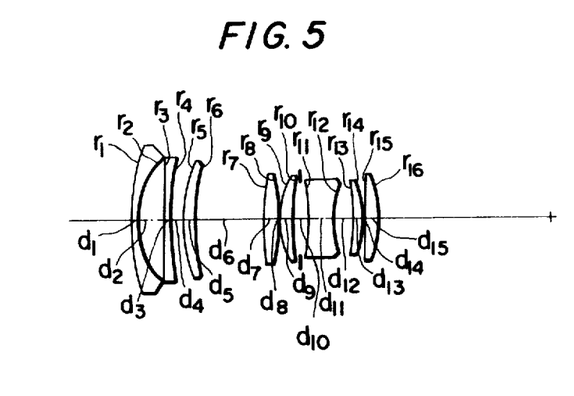
Figure 6A:
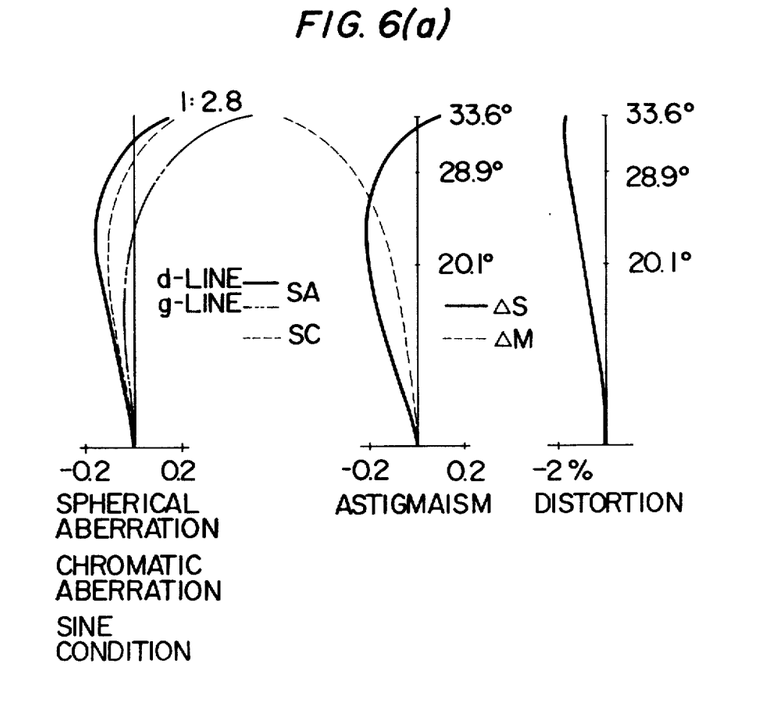
Figure 6B:
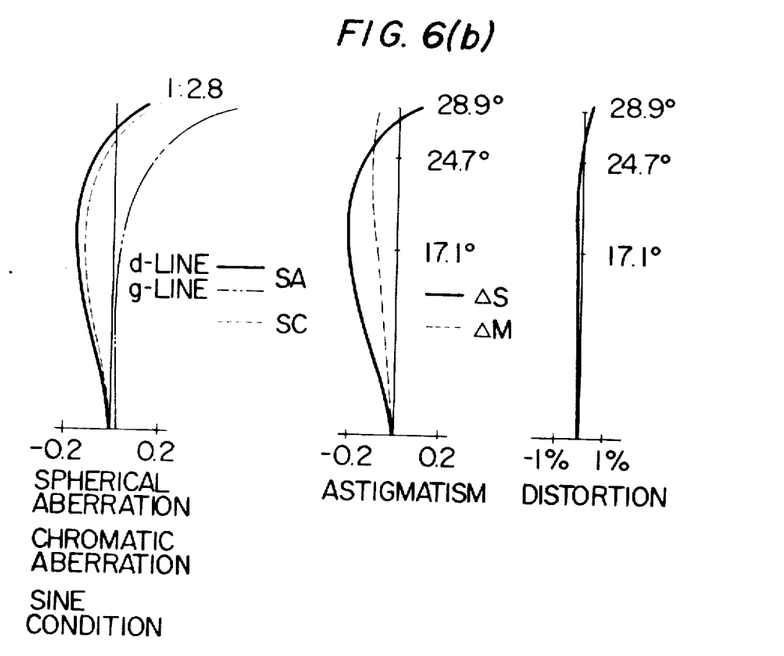

The third example is illustrative of the second embodiment and is shown in FIG. 5. Lenses $L_1$-$L_3$ form the front lens group while lenses $L_4$-$L_8$ form the rear lens group. The system parameters are as follows:

| $f = 33.181-39.1$ | | | view angle $2\omega = 67.2° - 57.8°$ | | |
|---|---|---|---|---|---|
| $L_i$ | j, k | r | d | n | ν |
| $L_1$ | 1 | 47.400 | 1.50 | 1.80610 | 40.9 |
|  | 2 | 19.380 |  |  |  |
|  |  |  | 5.75 |  |  |
| $L_2$ | 3 | −423.000 | 1.50 | 1.62041 | 60.3 |
|  | 4 | 91.640 |  |  |  |
|  |  |  | 2.40 |  |  |
| $L_3$ | 5 | 28.500 | 2.47 | 1.80518 | 25.4 |
|  | 6 | 49.138 |  |  |  |
|  |  |  | 14.80 − 6.74 |  |  |
| $L_4$ | 7 | 74.800 | 3.10 | 1.77250 | 49.6 |
|  | 8 | −51.555 |  |  |  |
|  |  |  | 0.10 |  |  |
| $L_5$ | 9 | 20.000 | 2.79 | 1.68600 | 49.2 |
|  | 10 | 61.864 |  |  |  |
|  |  |  | 2.95 |  |  |
| $L_6$ | 11 | −59.770 | 5.67 | 1.80518 | 25.4 |
|  | 12 | 21.083 |  |  |  |
|  |  |  | 4.15 |  |  |
| $L_7$ | 13 | −49.477 | 2.00 | 1.65160 | 58.6 |
|  | 14 | −24.406 |  |  |  |
|  |  |  | 0.69 |  |  |
| $L_8$ | 15 | −123.305 | 2.55 | 1.58913 | 61.6 |
|  | 16 | −28.909 |  |  |  |

$f_1 = -53.239$
$f_2 = 33.169$
$l_{max} = 14.80$
$d_I = d_4 = 2.49$
$d_{II} = d_{12} = 4.15$
$r_I = r_5 = 28.500$

| focal length | f number | back focal length |
|---|---|---|
| 33.181 | 1:2.8 | 37.073 |
| 39.1 | 1:2.8 | 40.776 |

EXAMPLE IV

Figure 7:
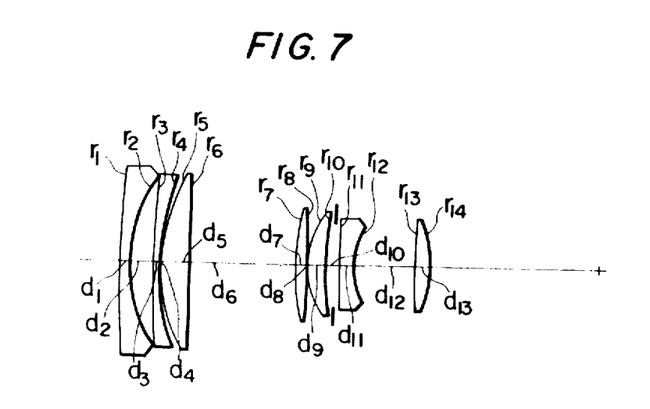
Figure 8A:
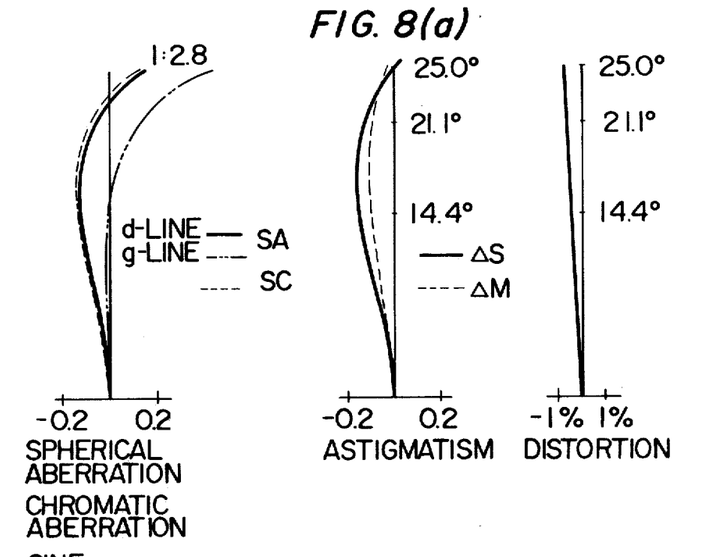
Figure 8B:
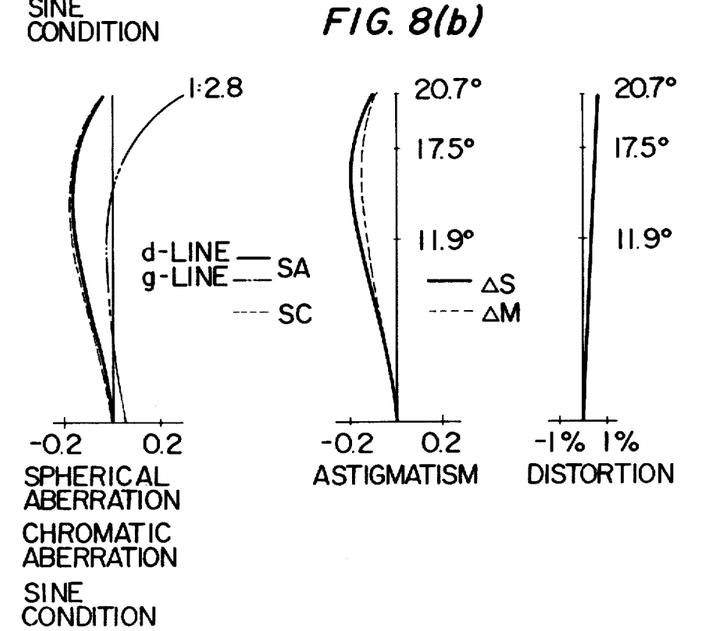

The fourth example is illustrative of the third embodiment and is shown in FIG. 7. Lenses $L_1$-$L_3$ form the front lens group and lenses $L_4$-$L_7$ form the rear lens group. The system parameters are as follows:

| f f = 46.8-57.0 | | | view angle $2\omega = 50.0° - 41.4°$ | | |
|---|---|---|---|---|---|
| $L_i$ | j, k | r | d | n | ν |
| $L_1$ | 1 | 323.760 | 1.98 | 1.78470 | 26.2 |
|  | 2 | 33.728 |  |  |  |
|  |  |  | 5.05 |  |  |
| $L_2$ | 3 | 277.500 | 1.40 | 1.48749 | 70.1 |
|  | 4 | 55.506 |  |  |  |
|  |  |  | 0.10 |  |  |
| $L_3$ | 5 | 39.396 | 5.62 | 1.80518 | 25.4 |
|  | 6 | 360.000 |  |  |  |
|  |  |  | 22.64 − 1.269 |  |  |
| $L_4$ | 7 | 50.752 | 2.60 | 1.77250 | 49.6 |
|  | 8 | −423.000 |  |  |  |

-continued

| L_i | j, k | r | d | n | ν |
|---|---|---|---|---|---|
| $L_5$ | 9 | 19.750 | 0.10 | | |
| | 10 | 61.697 | 3.91 | 1.81600 | 46.6 |
| | | | 2.93 | | |
| $L_6$ | 11 | 157.605 | 2.62 | 1.80518 | 25.4 |
| | 12 | 14.677 | | | |
| | | | 13.57 | | |
| $L_7$ | 13 | 115.000 | 3.18 | 1.46450 | 66.0 |
| | 14 | −35.349 | | | |

$f_1 = -120.748$
$f_2 = 46.288$
$l_{max} = 22.64$
$d_I = d_4 = 0.10$
$d_{II} = d_{12} = 13.57$
$r_I = r_5 = 39.396$

| focal length | f number | back focal length |
|---|---|---|
| 46.8 | 1:2.8 | 37.225 |
| 57.0 | 1:2.8 | 41.093 |

EXAMPLE V

Figure 9:
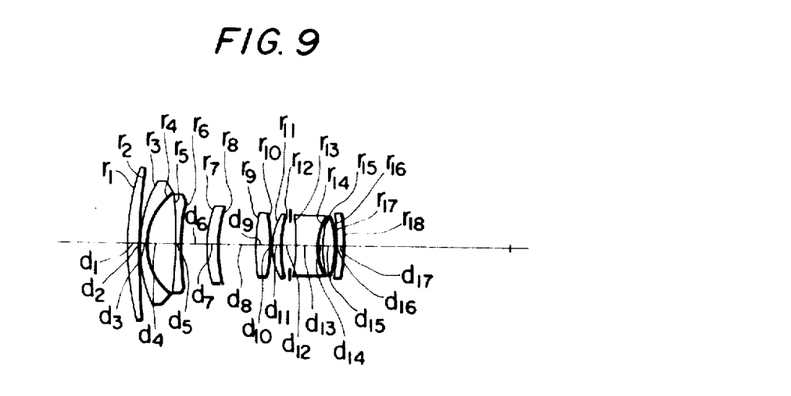
Figure 10A:
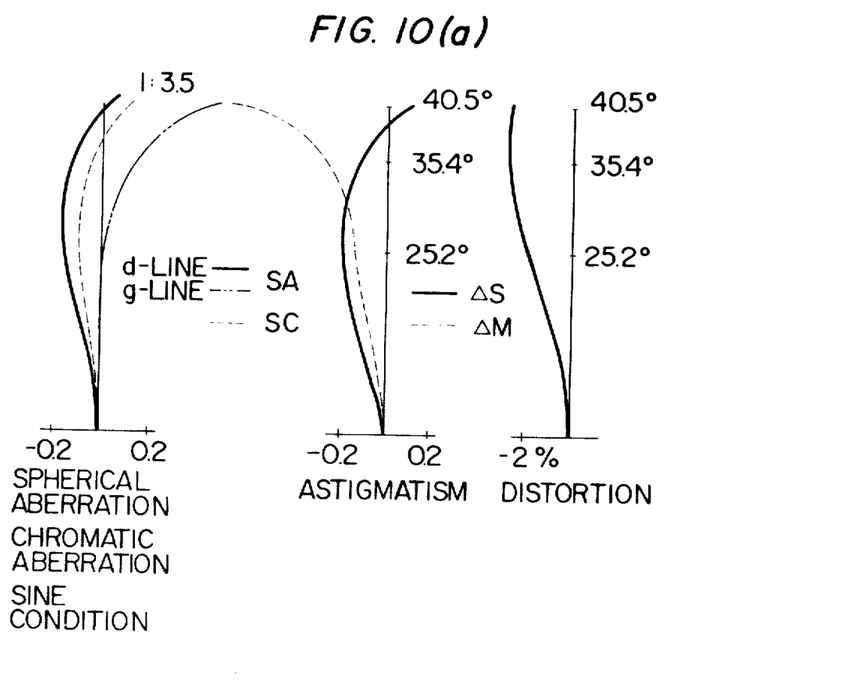
Figure 10B:
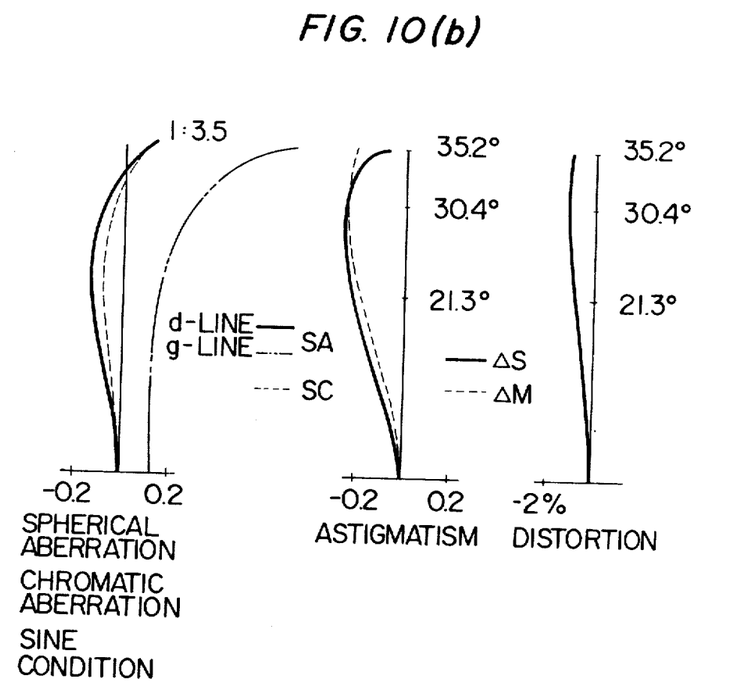

The fifth example is illustrative of the fourth embodiment of the present invention and is shown in FIG. 9. Lenses $L_1$–$L_4$ form the front lens group while lenses $L_5$–$L_9$ form the rear lens group. The system parameters are as follows:

f = 26.0–31.0    view angle 2ω = 81°–70.4°

| $L_i$ | j, k | r | d | n | ν |
|---|---|---|---|---|---|
| $L_1$ | 1 | 58.394 | 2.88 | 1.48749 | 70.1 |
| | 2 | 207.958 | | | |
| | | | 0.10 | | |
| $L_2$ | 3 | 34.288 | 1.16 | 1.80400 | 46.6 |
| | 4 | 12.987 | | | |
| | | | 6.28 | | |
| $L_3$ | 5 | −107.690 | 1.20 | 1.67790 | 50.7 |
| | 6 | 73.301 | | | |
| | | | 5.23 | | |
| $L_4$ | 7 | 22.937 | 2.77 | 1.80518 | 25.4 |
| | 8 | 31.500 | | | |
| | | | 8.08–3.67 | | |
| $L_5$ | 9 | 76.441 | 2.77 | 1.80610 | 40.9 |
| | 10 | −51.242 | | | |
| | | | 0.10 | | |
| $L_6$ | 11 | 18.113 | 2.13 | 1.80610 | 40.9 |
| | 12 | 55.678 | | | |
| | | | 2.72 | | |
| $L_7$ | 13 | −46.641 | 4.98 | 1.84666 | 23.9 |
| | 14 | 19.433 | | | |
| | | | 1.15 | | |
| $L_8$ | 15 | −1382.853 | 2.23 | 1.51823 | 59.0 |
| | 16 | −17.260 | | | |
| | | | 0.10 | | |
| $L_9$ | 17 | −196.186 | 1.74 | 1.51633 | 64.1 |
| | 18 | −33.448 | | | |

$f_1 = -28.540$
$f_2 = 24.937$

| focal length | f number | back focal length |
|---|---|---|
| 26.0 | 1:3.5 | 36.370 |
| 31.0 | 1:3.5 | 40.739 |

What is claimed is:

1. A compact, high performance low zoom ratio variable viewing angle lens system, comprising:
    a front lens group having a negative focal length $f_1$ and a final convex lens;
    a rear lens group having a positive focal length $f_2$;
    an aerial space of distance l between said front and rear lens groups in which the luminous flux is greatly divergent;
    the incidental covering angle being variable by varying the aerial space l, said lens system satisfying the following conditions:

$$0.7 \leq \frac{f_2}{f_{min}} \leq 1.3$$

$$0.1 \leq \frac{l_{max}}{f_{min}} \leq 0.7$$

where $l_{max}$ is the maximum value of the aerial space l, $f_{min}$ is the overall focal length at $l=l_{max}$, said lens system further having a back focal length of 0.8 Lϕ or more and a minimum value of the overall lens length including the back focal length of 2.3 Lϕ or less, where Lϕ is the length of the diagonal of the image frame, said lens system defined by the followings:

| Lens $L_i$ | j,k | r | d | n | ν |
|---|---|---|---|---|---|
| $L_1$ | 1 | 91.9 | 2.54 | 1.51823 | 59.0 |
| | 2 | 1069.190 | | | |
| | | | 0.10 | | |
| $L_2$ | 3 | 42.130 | 1.37 | 1.80400 | 46.6 |
| | 4 | 13.703 | | | |
| | | | 6.45 | | |
| $L_3$ | 5 | 465.000 | 1.49 | 1.67790 | 50.7 |
| | 6 | 28.750 | | | |
| | | | 5.19 | | |
| $L_4$ | 7 | 23.270 | 1.82 | 1.78470 | 26.2 |
| | 8 | 34.700 | | | |
| | | | 5.02–1.669 | | |
| $L_5$ | 9 | 56.700 | 4.19 | 1.80610 | 40.9 |
| | 10 | −59.400 | | | |
| | | | 0.10 | | |
| $L_6$ | 11 | 18.093 | 2.31 | 1.80610 | 40.9 |
| | 12 | 56.517 | | | |
| | | | 2.37 | | |
| $L_7$ | 13 | −64.907 | 7.24 | 1.84666 | 23.9 |
| | 14 | 16.331 | | | |
| | | | 1.12 | | |
| $L_8$ | 15 | 43.469 | 2.25 | 1.51823 | 59.0 |
| | 16 | −23.588 | | | |
| | | | 0.10 | | |
| $L_9$ | 17 | −89.373 | 1.47 | 1.51633 | 64.1 |
| | 18 | −26.047 | | | | f = 26.0–31.0    view angle 2ω = 81.2°–70.8°

2. A variable viewing angle lens system, wherein said front lens group comprises, in order from the object side, a positive lens having a convex surface directed to the object, two negative lens units and a positive meniscus lens having a convex surface directed to the object, wherein said rear lens group comprises, in order from the object side, a positive lens unit, a negative lens unit and a positive lens unit, both of said rear lens group positive lens units including at least two positive lenses, said lens system defined by the followings:

| $f = 26.0-31.0$ | | | view angle $2\omega = 80.6°-70.6°$ | | | |
|---|---|---|---|---|---|---|
| $L_i$ | j, k | r | d | n | v |
| $L_1$ | 1 | 90.728 | | | | |
| | | | 3.40 | 1.56873 | 63.1 |
| | 2 | −2811.257 | | | | |
| | | | 0.10 | | | |
| $L_2$ | 3 | 65.898 | | | | |
| | | | 1.50 | 1.80400 | 46.6 |
| | 4 | 15.890 | | | | |
| | | | 5.18 | | | |
| $L_3$ | 5 | 73.486 | | | | |
| | | | 1.40 | 1.80400 | 46.6 |
| | 6 | 27.490 | | | | |
| | | | 6.84 | | | |
| $L_4$ | 7 | 25.726 | | | | |
| | | | 2.40 | 1.80518 | 25.4 |
| | 8 | 40.610 | | | | |
| | | | 6.40−1.5341 | | | |
| $L_5$ | 9 | 38.361 | | | | |
| | | | 8.55 | 1.72342 | 38.0 |
| | 10 | −77.574 | | | | |
| | | | 2.00 | | | |
| $L_6$ | 11 | 22.047 | | | | |
| | | | 2.86 | 1.80400 | 46.6 |
| | 12 | 109.428 | | | | |
| | | | 1.53 | | | |
| $L_7$ | 13 | −48.177 | | | | |
| | | | 5.53 | 1.84666 | 23.9 |
| | 14 | 20.603 | | | | |
| | | | 1.94 | | | |
| $L_8$ | 15 | −193.273 | | | | |
| | | | 2.41 | 1.64000 | 60.1 |
| | 16 | −23.453 | | | | |
| | | | 0.10 | | | |
| $L_9$ | 17 | −5771.737 | | | | |
| | | | 2.10 | 1.51821 | 65.0 |
| | 18 | −33.615 | | | | |

3. A variable viewing angle lens system, wherein said front lens group comprises, in order from the object side, two negative lens and a positive lens, said positive lens having a strong convex surface directed to the object, wherein said rear lens group comprises, in order from the object side, a positive lens unit, a negative lens unit and a positive lens unit, both of said rear lens group positive lens units comprising two positive lenses, said lens system defined by the followings:

| $f = 33.181-39.1$ | | | view angle $2\omega = 67.2°-57.8°$ | | | |
|---|---|---|---|---|---|---|
| $L_i$ | j, k | r | d | n | v |
| $L_1$ | 1 | 47.400 | | | | |
| | | | 1.50 | 1.80610 | 40.9 |
| | 2 | 19.380 | | | | |
| | | | 5.75 | | | |
| $L_2$ | 3 | −423.000 | | | | |
| | | | 1.50 | 1.62041 | 60.3 |
| | 4 | 91.640 | | | | |
| | | | 2.40 | | | |
| $L_3$ | 5 | 28.500 | | | | |
| | | | 2.47 | 1.80518 | 25.4 |
| | 6 | 49.138 | | | | |
| | | | 14.80−6.74 | | | |
| $L_4$ | 7 | 74.800 | | | | |
| | | | 3.10 | 1.77250 | 49.6 |
| | 8 | −51.555 | | | | |
| | | | 0.10 | | | |
| $L_5$ | 9 | 20.000 | | | | |
| | | | 2.79 | 1.68600 | 49.2 |
| | 10 | 61.864 | | | | |

-continued

| $f = 33.181-39.1$ | | | view angle $2\omega = 67.2°-57.8°$ | | | |
|---|---|---|---|---|---|---|
| $L_i$ | j, k | r | d | n | v |
| | | | 2.95 | | | |
| $L_6$ | 11 | −59.770 | | | | |
| | | | 5.67 | 1.80518 | 25.4 |
| | 12 | 21.083 | | | | |
| | | | 4.15 | | | |
| $L_7$ | 13 | −49.477 | | | | |
| | | | 2.00 | 1.65160 | 58.6 |
| | 14 | −24.406 | | | | |
| | | | 0.69 | | | |
| $L_8$ | 15 | −123.305 | | | | |
| | | | 2.55 | 1.58913 | 61.6 |
| | 16 | −28.909 | | | | |

4. A variable viewing angle lens system, wherein said final convex lens in said front lens group is a positive lens having a strong convex surface directed to the object, wherein said rear lens group comprises, in order from the object side, a positive lens unit having two positive lenses, a negative lens unit and a positive lens unit having one positive lens, said lens system defined by the followings:

| $f = 46.8-57.0$ | | | view angle $2\omega = 50.0°-41.0°$ | | | |
|---|---|---|---|---|---|---|
| $L_i$ | j, k | r | d | n | v |
| $L_1$ | 1 | 323.760 | | | | |
| | | | 1.98 | 1.78470 | 26.2 |
| | 2 | 33.728 | | | | |
| | | | 5.05 | | | |
| $L_2$ | 3 | 277.500 | | | | |
| | | | 1.40 | 1.48749 | 70.1 |
| | 4 | 55.506 | | | | |
| | | | 0.10 | | | |
| $L_3$ | 5 | 39.396 | | | | |
| | | | 5.62 | 1.80518 | 25.4 |
| | 6 | 360.000 | | | | |
| | | | 22.64−1.269 | | | |
| $L_4$ | 7 | 50.752 | | | | |
| | | | 2.60 | 1.77250 | 49.6 |
| | 8 | −423.000 | | | | |
| | | | 0.10 | | | |
| $L_5$ | 9 | 19.750 | | | | |
| | | | 3.91 | 1.81600 | 46.6 |
| | 10 | 61.697 | | | | |
| | | | 2.93 | | | |
| $L_6$ | 11 | 157.605 | | | | |
| | | | 2.62 | 1.80518 | 25.4 |
| | 12 | 14.677 | | | | |
| | | | 13.57 | | | |
| $L_7$ | 13 | 115.000 | | | | |
| | | | 3.18 | 1.46450 | 66.0 |
| | 14 | −35.349 | | | | |

5. A low zoom ratio variable viewing angle lens system adjustable between wide angle and narrow angle positions, comprising:
   a front lens group having a negative focal length $f_1$ and comprising, in order from the object side, a positive lens having a convex surface directed to the object, two negative lens units and a final positive meniscus lens having a convex surface directed to the object;
   a rear lens group having a positive focal length $f_2$ and comprising, in order from the object side, a positive, a negative and a positive lens unit in which both positive lens units are composed of at least two positive lenses;
   said lens system satisfying the following conditions:

$$0.90 \leq \frac{|f_1|}{f_{min}f_{max}} \leq 1.10$$

$$0.80 \leq \frac{f_2}{|f_1|} \leq 0.95$$

where:

$f_{min}$ is the overall focal length of the system at the wide angle position; and $f_{max}$ is the overall focal length of the system at the narrow angle position, so that a sufficient back focal length can be maintained in a compact lens system having a very small zoom variation, said lens system defined by the followings:

| | | f = 26.0–31.0 | | view angle 2ω = 81°–70.4° | |
|---|---|---|---|---|---|
| $L_i$ | j, k | r | d | n | ν |
| $L_1$ | 1 | 58.394 | | | |
| | | | 2.88 | 1.48749 | 70.1 |
| | 2 | 207.958 | | | |
| | | | 0.10 | | |
| $L_2$ | 3 | 34.288 | | | |
| | | | 1.16 | 1.80400 | 46.6 |
| | 4 | 12.987 | | | |

-continued

| | | f = 26.0–31.0 | | view angle 2ω = 81°–70.4° | |
|---|---|---|---|---|---|
| $L_i$ | j, k | r | d | n | ν |
| | | | 6.28 | | |
| $L_3$ | 5 | −107.690 | | | |
| | | | 1.20 | 1.67790 | 50.7 |
| | 6 | 73.301 | | | |
| | | | 5.23 | | |
| $L_4$ | 7 | 22.937 | | | |
| | | | 2.77 | 1.80518 | 25.4 |
| | 8 | 31.500 | | | |
| | | | 8.08–3.67 | | |
| $L_5$ | 9 | 76.441 | | | |
| | | | 2.77 | 1.80610 | 40.9 |
| | 10 | −51.242 | | | |
| | | | 0.10 | | |
| $L_6$ | 11 | 18.113 | | | |
| | | | 2.13 | 1.80610 | 40.9 |
| | 12 | 55.678 | | | |
| | | | 2.72 | | |
| $L_7$ | 13 | −46.641 | | | |
| | | | 4.98 | 1.84666 | 23.9 |
| | 14 | 19.433 | | | |
| | | | 1.15 | | |
| $L_8$ | 15 | −1387.853 | | | |
| | | | 2.23 | 1.51823 | 59.0 |
| | 16 | −17.260 | | | |
| | | | 0.10 | | |
| $L_9$ | 17 | −196.186 | | | |
| | | | 1.74 | 1.51633 | 64.1 |
| | 18 | −33.488 | | | |

* * * * *